United States Patent
Strasser

(10) Patent No.: US 10,749,412 B2
(45) Date of Patent: Aug. 18, 2020

(54) POSITION-MEASURING DEVICE AND METHOD FOR OPERATING A POSITION-MEASURING DEVICE

(71) Applicant: DR. JOHANNES HEIDENHAIN GmbH, Traunreut (DE)

(72) Inventor: Erich Strasser, Trostberg (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 382 days.

(21) Appl. No.: 15/823,609

(22) Filed: Nov. 28, 2017

(65) Prior Publication Data

US 2018/0159405 A1 Jun. 7, 2018

(30) Foreign Application Priority Data

Dec. 2, 2016 (DE) ........................ 10 2016 224 012

(51) Int. Cl.
| | | |
|---|---|---|
| *G01D 5/347* | (2006.01) | |
| *G01D 5/34* | (2006.01) | |
| *H02K 11/21* | (2016.01) | |
| *G01D 5/14* | (2006.01) | |
| *F16D 55/22* | (2006.01) | |

(Continued)

(52) U.S. Cl.
CPC ............ *H02K 11/21* (2016.01); *F16D 55/22* (2013.01); *G01D 5/145* (2013.01); *G01D 5/34* (2013.01); *G01D 5/3473* (2013.01); *G01D 5/34746* (2013.01); *G01D 13/14* (2013.01); *G05B 19/19* (2013.01); *F16D 71/00* (2013.01)

(58) Field of Classification Search
CPC ...... G01D 5/145; G01D 5/3473; G01D 13/14; G01D 5/34; G01D 5/34746; G01D 18/00; G01D 1/18; G01D 3/08; G01B 5/0014; G01B 7/02; G01B 7/30
USPC .......................................................... 33/706
See application file for complete search history.

(56) References Cited

U.S. PATENT DOCUMENTS

| | | | | |
|---|---|---|---|---|
| 4,942,295 A | * | 7/1990 | Brunner | G01D 5/24442 250/231.13 |
| 5,062,214 A | * | 11/1991 | Gustafsson | G01D 5/34792 33/706 |

(Continued)

FOREIGN PATENT DOCUMENTS

| | | |
|---|---|---|
| DE | 102014011265 A1 | 1/2016 |
| DE | 102014113374 A1 | 3/2016 |

(Continued)

*Primary Examiner* — Yaritza Guadalupe-McCall
(74) *Attorney, Agent, or Firm* — Leydig, Voit & Mayer Ltd.

(57) ABSTRACT

A position-measuring device includes a graduation carrier which carries a measuring graduation and is non-rotatably connectable to a shaft. A scanner is configured to generate scanning signals by scanning the measuring graduation. Evaluation electronics are configured to process the scanning signals into a digital angle value of the shaft. An interface is configured to communicate with subsequent electronics. The scanner is mountable on a machine part that is supported so as to be movable in an axial direction of the shaft, so that the scanning signals are dependent on a position of the machine part in the axial direction of the shaft, and so that a measure of the position of the machine part in the axial direction of the shaft is determinable from the scanning signals by the evaluation electronics.

15 Claims, 3 Drawing Sheets

(51) Int. Cl.
*G01D 13/14* (2006.01)
*G05B 19/19* (2006.01)
*F16D 71/00* (2006.01)

(56) References Cited

U.S. PATENT DOCUMENTS

| | | | | |
|---|---|---|---|---|
| 5,553,390 A * | 9/1996 | Ernst | ............... | B61L 25/025 33/706 |
| 5,651,187 A * | 7/1997 | Affa | ............... | G01D 5/2457 33/706 |
| 5,793,201 A * | 8/1998 | Nelle | ............... | G01B 7/02 324/207.14 |
| 5,905,350 A * | 5/1999 | Hofbauer | ............... | G01D 5/24409 318/400.28 |
| 6,018,881 A * | 2/2000 | Spies | ............... | G01D 5/145 324/207.24 |
| 6,304,190 B1 | 10/2001 | Blasing | | |
| 6,487,787 B1 * | 12/2002 | Nahum | ............... | G01D 18/008 33/702 |
| 6,806,461 B2 | 10/2004 | Strasser | | |
| 6,904,695 B2 * | 6/2005 | Freitag | ............... | G01D 5/34707 33/645 |
| 7,325,327 B2 * | 2/2008 | Fischer | ............... | G01D 3/022 33/366.24 |
| 7,500,320 B2 * | 3/2009 | Schroter | ............... | G01D 5/34707 33/613 |
| 7,971,487 B2 * | 7/2011 | Carlen | ............... | G01D 18/00 73/760 |
| 8,296,964 B2 * | 10/2012 | Siraky | ............... | G01D 5/2497 33/706 |
| 9,046,386 B2 * | 6/2015 | Ahrendt | ............... | G01D 5/34707 |
| 9,109,975 B2 * | 8/2015 | Revach | ............... | G01M 13/021 |
| 9,212,893 B2 * | 12/2015 | Auer | ............... | G01B 7/003 |
| 9,500,476 B2 * | 11/2016 | Mikesell | ............... | F16H 25/2015 |
| 2009/0271998 A1 * | 11/2009 | Carlen | ............... | G01D 18/00 33/706 |
| 2012/0229799 A1 * | 9/2012 | Ahrendt | ............... | G01D 5/34707 356/138 |
| 2014/0245625 A1 * | 9/2014 | Mikesell | ............... | F16H 25/2015 33/706 |
| 2014/0290084 A1 * | 10/2014 | Revach | ............... | G01B 21/02 33/701 |
| 2016/0076910 A1 | 3/2016 | Ausserlechner | | |
| 2018/0136015 A1 * | 5/2018 | von Berg | ............... | G01D 5/347 |
| 2018/0159405 A1 * | 6/2018 | Strasser | ............... | H02K 11/21 |
| 2020/0124415 A1 * | 4/2020 | Schwaiger | ............... | G01B 21/22 |

FOREIGN PATENT DOCUMENTS

| | | |
|---|---|---|
| EP | 1126248 A2 | 8/2001 |
| EP | 1477699 A2 | 11/2004 |
| KR | 20160023547 A | 3/2016 |
| WO | WO 9900645 A1 | 1/1999 |

\* cited by examiner

POSITION-MEASURING DEVICE AND METHOD FOR OPERATING A POSITION-MEASURING DEVICE

CROSS-REFERENCE TO PRIOR APPLICATION

Priority is claimed to German Patent Application No. DE 10 2016 224 012.9, filed on Dec. 2, 2016, the entire disclosure of which is hereby incorporated by reference herein.

FIELD

The present invention relates to a position-measuring device of the type having a graduation carrier which carries a measuring graduation and is non-rotatably connectable to a shaft, a scanning unit for generating scanning signals by scanning the measuring graduation, evaluation electronics for processing the scanning signals into a digital angle value of the shaft, and an interface unit for communicating with subsequent electronics. The present invention also relates to a method for operating such a position-measuring device. The present invention also relates to a braking system for an electric motor.

BACKGROUND

Very often, especially in automation technology, position-measuring devices are needed to monitor linear and rotational movements. Linear movements are monitored using so-called length-measuring devices, whereas rotational movements are monitored using so-called rotary encoders or angle-measuring devices.

Rotational movements are mostly produced by electric motors which drive a motor shaft that moves machine parts of technical equipment, possibly via clutches and transmissions. In order to be able to perform accurate positioning operations, electric motors are operated in control loops; one speaks here also of servo drives. Actual position values, which are required for feedback control, are continuously measured by monitoring the angular position and/or the number of revolutions of the shaft of a position-measuring device (rotary encoder or angle-measuring device).

EP 1 126 248 A2 describes a position-measuring device that is suitable for this purpose. This position-measuring device includes a measuring graduation on a graduation carrier that is non-rotatably connectable to the shaft, so that the measuring graduation rotates in a measuring graduation plane which is perpendicular to the axis of rotation of the shaft. To permit scanning of the measuring graduation, a scanning unit is disposed opposite the same during operation, the scanning unit being disposed in a scanning plane parallel to the measuring graduation plane. The distance between the planes is referred to as scanning distance. During assembly of the position-measuring device, this distance is set as precisely as possible to achieve an optimum operating condition.

In addition to rotational movements, it is often also necessary to measure linear movements of machine parts that move in the axial direction of the motor shaft. This is the case with braking devices, for example. These serve to allow an electric motor to be quickly braked and brought to a standstill in the event of a failure. To do this, a machine part supported so as to be movable in the axial direction of the shaft is pressed with a force against a brake disk that is non-rotatably connected to the shaft. This contact causes friction, which produces a braking effect. In order to optimize the braking process, a brake lining is disposed in the region where the friction occurs. Since the brake lining is abraded over time, it is desired to monitor the thickness of the brake lining so as to be able to replace it in time during a maintenance operation. The thickness of the brake lining can be inferred, for example, by measuring the distance that the movably supported machine part must travel in order to activate the brake. This can be done using a length-measuring device. However, this involves considerable structural complexity and is also expensive.

SUMMARY

In an embodiment, the present invention provides a position-measuring device including a graduation carrier which carries a measuring graduation and is non-rotatably connectable to a shaft. A scanner is configured to generate scanning signals by scanning the measuring graduation. Evaluation electronics are configured to process the scanning signals into a digital angle value of the shaft. An interface is configured to communicate with subsequent electronics. The scanner is mountable on a machine part that is supported so as to be movable in an axial direction of the shaft, so that the scanning signals are dependent on a position of the machine part in the axial direction of the shaft, and so that a measure of the position of the machine part in the axial direction of the shaft is determinable from the scanning signals by the evaluation electronics.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An embodiment of the present invention provides a device that allows measuring the position of a machine part in the axial direction of a motor shaft without adding much complexity.

According to an embodiment, the position-measuring device comprises:
- a graduation carrier which carries a measuring graduation and is non-rotatably connectable to a shaft,
- a scanning unit for generating scanning signals by scanning the measuring graduation,
- evaluation electronics for processing the scanning signals into a digital angle value of the shaft, and
- an interface unit for communicating with subsequent electronics.

The scanning unit is mountable on a machine part that is supported so as to be movable in an axial direction of the shaft, so that the scanning signals are dependent on the position of the machine part in the axial direction of the shaft. A measure of this position of the machine part can be determined from the scanning signals by the evaluation electronics.

Another embodiment of the present invention provides a method that allows measuring the position of a machine part in the axial direction of a motor shaft without adding much complexity.

According to an embodiment, the method for operating a position-measuring device comprises:

- a graduation carrier which carries a measuring graduation and is non-rotatably connectable to a shaft,
- a scanning unit for generating scanning signals by scanning the measuring graduation,
- evaluation electronics for processing the scanning signals into a digital angle value of the shaft, and
- an interface unit for communicating with subsequent electronics.

The scanning unit is mounted on a machine part that is supported so as to be movable in the axial direction of the shaft, so that the scanning signals are dependent on the position of the machine part in the axial direction of the shaft. In the evaluation electronics, a measure of this position of the machine part is determined from the scanning signals.

The use of a position-measuring device according to embodiments of the present invention and the execution of the corresponding method are particularly advantageous in connection with a motor brake.

Figure 1:
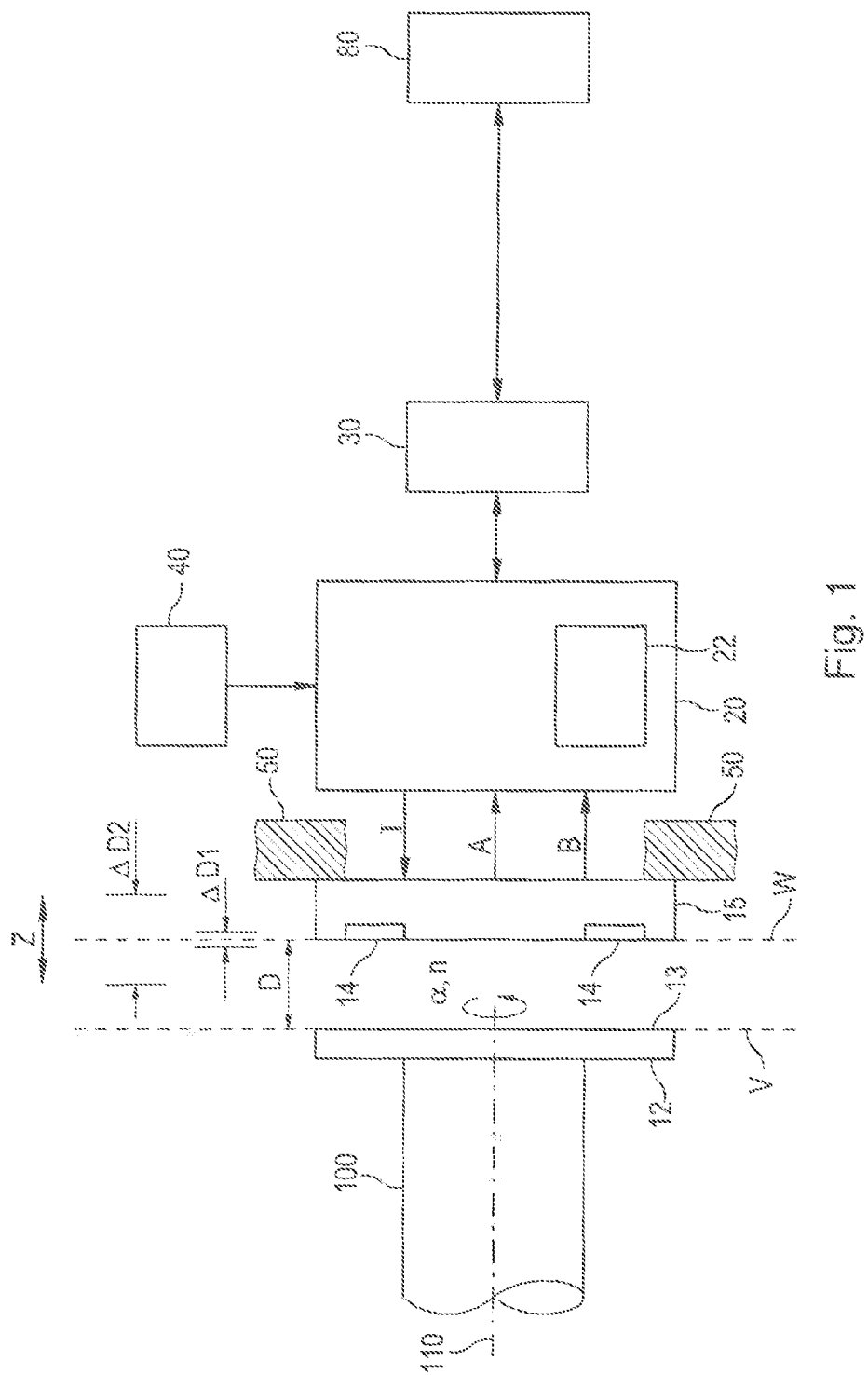
FIG. 1 is a block diagram of a position-measuring device according to an embodiment of the present invention.

FIG. 1 shows an exemplary embodiment of a position-measuring device according to the present invention. The position-measuring device includes a graduation carrier 12 having a measuring graduation 13, a scanning unit 15 having scanning elements 14, evaluation electronics 20, as well as an interface unit 30.

Graduation carrier 12 is disk-shaped and measuring graduation 13 is disposed radially about a center of rotation of the disk. Graduation carrier 12 is connectable to a shaft 100, so that measuring graduation 13 rotates in a measuring graduation plane V perpendicular to an axis of rotation 110 of shaft 100. Scanning unit 15 is disposed opposite graduation carrier 12, so that scanning elements 14 are in a scanning plane W parallel to measuring graduation plane V. Scanning signals A, B resulting from the scanning of measuring graduation 13 by scanning elements 14 are fed to evaluation electronics 20. At least two scanning signals A, B have a phase difference that allows determining the direction of rotation. In most cases, the phase difference is 90°.

Position-measuring devices use different physical scanning principles, such as, for example, optical, magnetic, capacitive or inductive scanning principles.

Regardless of the scanning principle, scanning signals A, B are position-dependent; i.e., they vary as a function of the angular position α of the rotating shaft 100, on the one hand, but on the other hand, they are also dependent on scanning distance D; i.e., the distance between measuring graduation 13 and scanning elements 14. In the example, this distance corresponds to the distance between measuring graduation plane V and scanning plane W.

Evaluation electronics 20 determine from scanning signals A, B in known manner the angular position a, and possibly the number of revolutions n, of graduation carrier 12 and thus of shaft 100. Evaluation electronics 20 also determine scanning distance D from scanning signals A, B. This can be done by evaluating the amplitude values or the peak-to-peak values of scanning signals A, B, but it is also possible to use the instantaneous values of scanning signals A, B. Other factors that may have an influence on scanning signals A, B, such as, for example, the rotational speed of shaft 100, may also be taken into account in the determination of scanning distance D, if necessary.

Scanning distance D may be given directly as a position value or indirectly as a voltage value, for example. There are known position-measuring devices (e.g., from the above-mentioned EP 1 126 248 A1) where an excitation signal of scanning unit 15 is readjusted based on scanning signals A, B in such a way that scanning signals A, B will always have the same signal amplitude. In such a feedback control system, for example, the manipulated variable for adjusting the excitation signal or the reference variable that determines the excitation signal is a measure of scanning distance D. In the example shown, the manipulated variable is an excitation current I.

Angular position a, the number of revolutions n, and scanning distance D may be fed to interface unit 30 and transmittable by it to subsequent electronics 80. Advantageously, interface unit 30 is configured as a digital serial interface. Frequently, subsequent electronics 80 is a so-called master that initiates all data transmissions, and the position-measuring device is a so-called slave that transmits data only when it receives a corresponding command via interface unit 30.

In the prior art, the goal is always to adjust scanning distance D as precisely as possible during assembly, and to install graduation carrier 12 and scanning unit 15 in a manner that prevents movement in the direction of the axis of rotation of shaft 100. In this way, a change in the signal amplitudes of scanning signals A, B resulting from a change in scanning distance D is avoided, and optimum scanning signals A, B are always available for determining the angular position α and the number of revolutions n. However, minute changes in scanning distance D caused, for example, by temperature-induced changes in the length of shaft 100 or wobbling motion of the graduation carrier, etc., may nevertheless occur, so that scanning distance D varies maximally within a range ΔD1.

The position-measuring device of the present invention is suitably configured such that scanning unit 15 can be mounted so as to be movable relative to graduation carrier 12 in axial direction Z of shaft 100, for example on a machine part 50 (shown only schematically here) that it is supported so as to be movable in axial direction Z. The mounting is accomplished such scanning distance D is precisely set for normal operation of the position-measuring device, so that scanning distance D varies only within a first range ΔD1. Changes in scanning distance D within first range ΔD1 are due to thermal expansion effects, for example. However, during distance measurement operation, scanning distance D is now allowed to vary within a second range ΔD2 that is greater than and encompasses the first range ΔD1. In second range ΔD2, angular position α can still be determined, possibly with reduced accuracy. Advantageously, during distance measurement operation, shaft 100 is permitted to rotate at a lower rotational speed than during normal operation. It is particularly advantageous if the distance measurement operation is carried out while shaft 100 is at rest.

If machine part 50, on which scanning unit 15 is mounted, moves, the position of machine part 50 can be measured by measuring scanning distance D. In other words, scanning distance D is a measure of the position of machine part 50.

The measurement may be initiated by subsequent electronics 80 via a corresponding command transmitted through interface unit 30 to evaluation electronics 20. Also, evaluation electronics 20 may be configured to detect abrupt changes in scanning distance D, especially changes that exceed first range ΔD1, and to thereupon initiate a measurement of scanning distance D. This is particularly advantageous when the machine part 50 to be monitored is moved back and forth between at least two positions.

The measurement of scanning distance D to determine the position of machine part 50 is advantageously carried out under identical operating conditions, so that external influences, such as thermal expansions, which may also change scanning distance D, cannot corrupt the measurement result. In addition, at least one temperature sensor 40 may be provided whose measurement value is fed to evaluation electronics 20, allowing it to account for the influence of temperature. Additional sensors may be provided to compensate for other influences.

The value determined as a measure of the position of machine part 50 (i.e. in this example scanning distance D) may be stored in a memory unit 22 disposed in evaluation electronics 20, but alternatively it may be transmitted directly to subsequent electronics 80. If this value is not present as a measure of length, but as a different physical quantity (e.g., signal amplitudes/instantaneous values of scanning signals A, B, or excitation current I), it may be suitably converted into a measure of length in evaluation electronics 20. The conversion may be based on a conversion table, which may also be stored in memory unit 22.

Memory unit 22 may have stored therein a threshold value for a maximum and/or a minimum scanning distance D. By comparing the currently measured scanning distance D to stored threshold values, fault conditions can be detected and, possibly, a corresponding status message may be transmitted to subsequent electronics 80.

For purposes of determining the value that is a measure of the position of machine part 50, measuring graduation 13 may include a separate graduation track which is scanned by separate scanning elements 14 provided in scanning unit 15. In this case, the scanning signals used to determine this value may be different from the scanning signals that are processed into digital angle values α.

Figure 2:
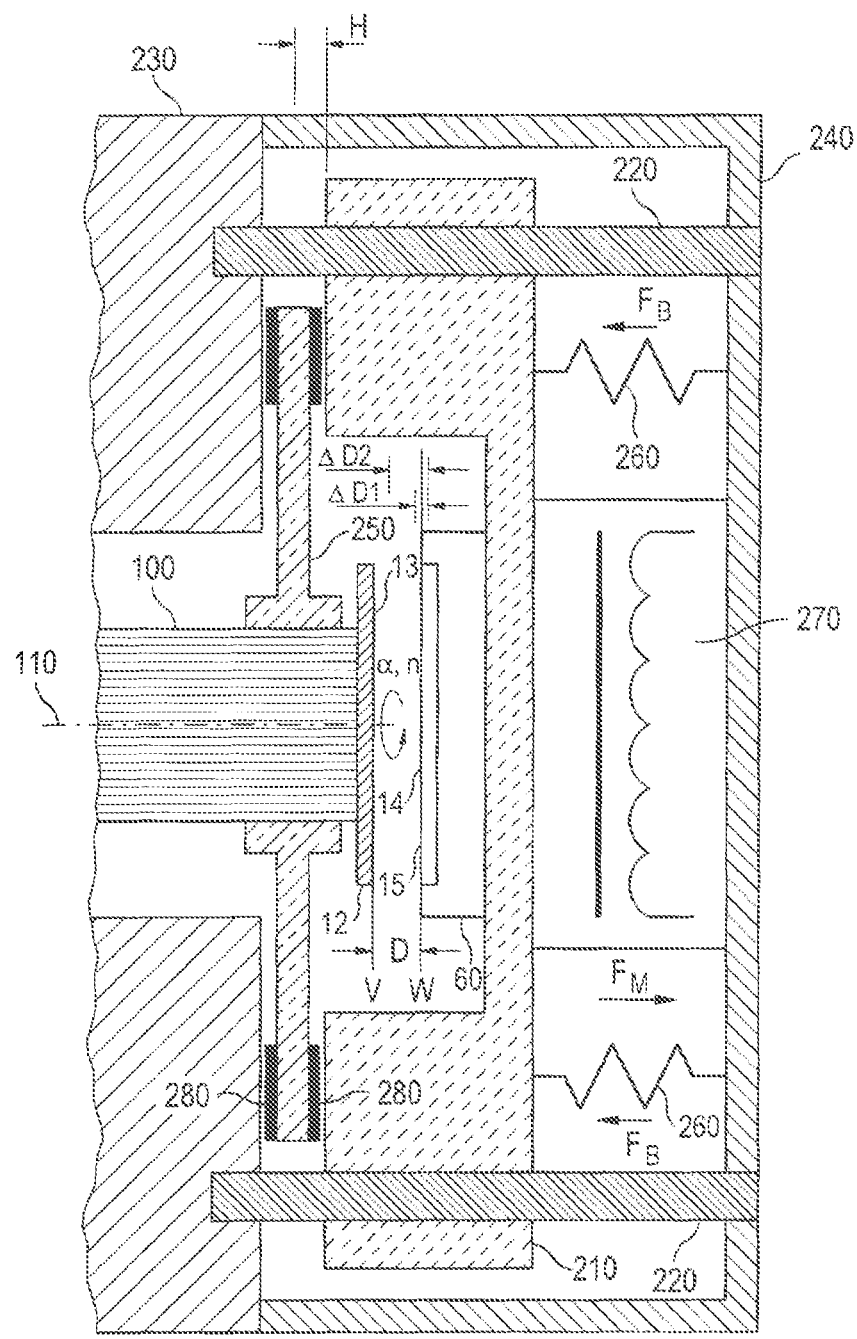
FIG. 2 is a simplified cross-sectional view of a motor-braking system.

FIG. 2 shows a functional schematic of a braking system for an electric motor, which is disposed at the end of shaft 100 that faces away from the driving end of the motor. For purposes of monitoring the functioning of the brake, in particular the state of wear of brake linings, a position-measuring device having the features described in connection with FIG. 1 is used. In FIG. 2, the brake is shown in the released condition.

The operating principle on which a motor brake is based is to activate the brake by acting, with a first force acting in the axial direction of the shaft, upon a machine part that is stationary relative to the rotation of the shaft, but is supported by guide means so as to be movable in the axial direction, and to thereby press a surface of the machine part against a surface of a brake disk co-rotating with the shaft. This causes friction, which produces the braking effect. In order to optimize the braking effect and ensure uniform braking, and also to make the friction-induced wear controllable, a brake lining is disposed between the braking surfaces (the surfaces between which the friction occurs as a result of the braking process). In order to release the brake, a second force acts on the machine part, also in the axial direction of the shaft, and moves the machine part away from the brake disk, so that no more friction occurs. The first and second forces act in opposite directions. They may be produced by any desired force-generating means, such as, for example, springs, electromagnets, masses, . . . etc.

In the exemplary embodiment two of FIG. 2, in order to implement this operating principle, an armature plate 210 is provided as a movably supported machine part, and at least two guide pins 220 serve as guide means. Armature plate 210 is supported by guide pins 220 so as to be movable in the axial direction of shaft 100. Guide pins 220 are connected to a housing block 230 of the motor, on the one hand, and to a mounting frame 240, on the other hand, and both prevent armature plate 210 from being rotated in the direction of rotation of shaft 100.

A brake disk 250 is non-rotatably connected to shaft 100 and co-rotates therewith. At least one compression spring 260 is provided as a force-generating means to produce first force FB, the compression spring pushing armature plate 210 toward brake disk 250. Second force FM is produced by an electromagnet 270 which, when energized, pulls armature plate 210 away from brake disk 250, thereby releasing the brake.

When the brake is activated, first force FB causes brake disk 250 to be elastically deformed toward and pressed against a braking surface disposed on housing block 230 of the motor, so that friction is generated at the two sides of brake disk 250, thereby producing a braking effect.

Brake linings 280 are disposed on brake disk 250 on the surfaces where friction is generated.

Between the released brake (electromagnet 270 energized) and the activated brake (electromagnet 270 de-energized), armature plate 210 travels a brake travel distance H in the axial direction of shaft 100. The thickness of brake linings 280 has an important influence on brake travel distance H, because this thickness decreases over time due to wear (abrasion), as a result of which brake travel distance H increases. However, this means also that the state of wear of brake linings 280 can be inferred by measuring the brake travel distance H.

The braking system further includes a position-measuring device, such as has been described in connection with FIG. 1, for example. Graduation carrier 12 of the position-measuring device is non-rotatably connected to the end of shaft 100 and thus co-rotates with shaft 100, just like brake disk 250.

At least scanning unit 15, but advantageously also evaluation electronics 20, as well as interface unit 30, are disposed in a housing 60 that is mounted on armature plate 210 (analogously to machine part 50 of FIG. 1), so that measuring graduation 13 and scanning elements 14 face each other. Thus, the angular position α of shaft 100 and the number of revolutions n made by it can be measured by the position-measuring device in a known manner.

As already illustrated in FIG. 1, in this arrangement, measuring graduation 13 is disposed in a measuring graduation plane V, and scanning unit 15, in particular scanning elements 14, parallel thereto in a scanning plane W.

In this arrangement, the change in scanning distance D of the position-measuring device during activation or release of the brake corresponds directly to brake travel distance H of the brake. Since, as described above, brake travel distance H is dependent on the thickness of the brake linings, the scanning distance D in the activated condition of the brake is also a measure of the thickness of brake linings 280 and can therefore be used for monitoring the thickness of brake linings 280.

For purposes of monitoring the thickness of brake linings 280, advantageously, in an initial condition of brake (new brake linings 280), scanning distance D is measured while the brake is in the activated condition, and the distance measured is stored as a reference value. For storage purposes, a memory unit 22 may be provided in evaluation electronics 20. Alternatively, the reference value may also be transmitted to and stored in subsequent electronics 80.

The measurement of scanning distance D to determine the thickness of brake linings 280 is advantageously performed at standstill; i.e., while shaft 100 is a rest. This prevents other influences on scanning distance D from corrupting the measurement result, eliminating the need to account for such influences in the measurement.

Figure 3:
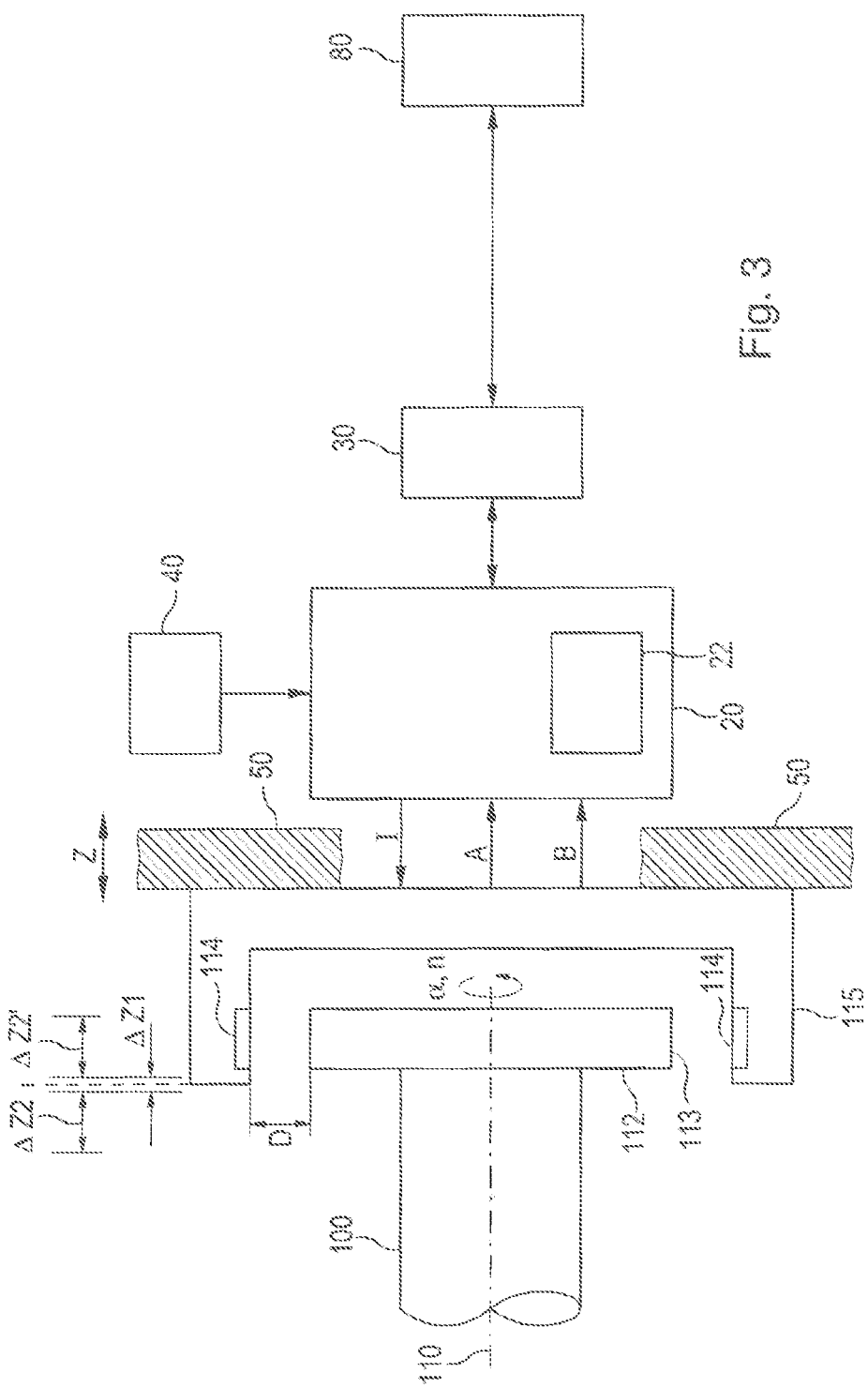
FIG. 3 is a block diagram of an alternative embodiment of a position-measuring device according to the present invention.

FIG. 3 shows an alternative embodiment of a position-measuring device according to the present invention. Components which have already been described in connection with the position-measuring device in FIG. 1 have been given the same reference numerals.

Unlike the preceding exemplary embodiment, graduation carrier 112 is here cylindrical in shape, and measuring graduation 113 is disposed on the lateral surface of the cylinder. Scanning elements 114 of scanning unit 115 are disposed at a scanning distance D from measuring graduation 113. Scanning elements 114 may be mounted at only one location or at multiple locations distributed around the circumference of the cylinder. Especially in cases where an inductive scanning principle is used, it is advantageous for the scanning elements (exciter and receiver coils) to be configured so as to surround the lateral surface of the cylinder.

Again, scanning unit 115 is mountable on a machine part 50 that is supported so as to be movable in axial direction Z of shaft 100. The mounting is accomplished such that the amplitudes of scanning signals A, B reach a maximum during normal operation in terms of the travel path of machine part 50 in axial direction Z. If the width of measuring graduation 113 (which ideally is equal to the height of the cylindrical graduation carrier) exceeds the width of the active areas of scanning elements 114, there is a narrow range $\Delta Z1$ within which a movement of machine part 50 in axial direction Z does not any influence on the amplitude of scanning signals A, B. However, if during distance measurement operation, machine part 50 moves within the ranges $\Delta Z2$ or $\Delta Z2'$ following the range $\Delta Z1$ in the respective directions of movement, the amplitude of scanning signals A, B decreases and is then a measure of the position of machine part 50 in axial direction Z again.

Analogously to the previous exemplary embodiment, the distance measurement operation is advantageously carried out at low rotational speeds, in particular while shaft 100 is at rest.

In this embodiment, too, provision may be made to readjust an excitation signal of scanning unit 115 based on scanning signals A, B in such a way that scanning signals A, B will always have the same signal amplitude. Here, too, feedback control parameters, such as, for example, the manipulated variable for adjusting the excitation signal, or the reference variable for adjusting the manipulated variable, may be a measure of the position of machine part 50. In the example shown, excitation current I is the manipulated variable.

Thus, graduation carrier 112 and its measuring graduation 113 as well as scanning unit 115 can replace the graduation carrier 12 and its measuring graduation 13 as well as the scanning unit 15 and its scanning elements 14 in FIG. 2.

The present invention is not limited to the exemplary embodiments described herein, but rather may be implemented by those skilled in the art in an alternative manner within the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A position-measuring device, comprising:
    a graduation carrier which carries a measuring graduation and is non-rotatably connectable to a shaft;
    a scanner configured to generate scanning signals by scanning the measuring graduation;
    evaluation electronics configured to process the scanning signals into a digital angle value of the shaft; and
    an interface configured to communicate with subsequent electronics,
    wherein the scanner is mountable on a machine part that is supported so as to be movable in an axial direction of the shaft, so that the scanning signals are dependent on a position of the machine part in the axial direction of the shaft, and so that a measure of the position of the machine part in the axial direction of the shaft is determinable from the scanning signals by the evaluation electronics.

2. The position-measuring device as recited in claim 1, wherein:
    the graduation carrier is disk-shaped and the measuring graduation is disposed radially about the axis of rotation of the shaft in a measuring graduation plane which is perpendicular to the axis of rotation of the shaft,
    in the evaluation electronics, a scanning distance between the measuring graduation and scanning elements is determinable as a measure of the position of the machine part in the axial direction of the shaft,
    during normal operation, the scanning distance is variable within a first range, and
    during a distance measurement operation measuring the position of the machine part, the scanning distance is variable within a second range that is greater than and encompasses the first range.

3. The position-measuring device as recited in claim 1, wherein the graduation carrier is cylindrical in shape, the measuring graduation is disposed on a lateral surface of the cylinder, and scanning elements of the scanner are disposed at a scanning distance from the measuring graduation.

4. The position-measuring device as recited in claim 1, wherein the evaluation electronics contains a memory in which the determined measure of the position of the machine part is configured to be stored.

5. The position-measuring device as recited in claim 1, wherein the measurement of the position of the machine part is initiatable by the subsequent electronics via a command that is transmittable through the interface to the evaluation electronics.

6. The position-measuring device as recited in claim 1, wherein the evaluation electronics is configured to detect abrupt changes in the position of the machine part and to initiate a measurement based on detecting one of the abrupt changes occurring.

7. The position-measuring device as recited in claim 1, wherein the machine part is an armature plate of a motor brake.

8. A method for operating a position-measuring device, the method comprising:
providing the position-measuring device comprising:
a graduation carrier which carries a measuring graduation and is non-rotatably connected to a shaft;
a scanner which generates scanning signals by scanning the measuring graduation;
evaluation electronics which process the scanning signals into a digital angle value of the shaft; and
an interface which communicates with subsequent electronics, and
mounting the scanner on a machine part that is supported so as to be movable in an axial direction of the shaft, so that the scanning signals are dependent on the position of the machine part in the axial direction of the shaft, and so that a measure of the position of the machine part in the axial direction of the shaft is determined from the scanning signals in the evaluation electronics.

9. The method as recited in claim 8, wherein:
the graduation carrier is disk-shaped and the measuring graduation is disposed radially about the axis of rotation of the shaft in a measuring graduation plane which is perpendicular to the axis of rotation of the shaft,
in the evaluation electronics, a scanning distance between the measuring graduation and scanning elements is determined as a measure of the position of the machine part in the axial direction of the shaft,
during normal operation, the scanning distance varies within a first range, and
during a distance measurement operation measuring the position of the machine part, the scanning distance varies within a second range that is greater than and encompasses the first range.

10. The method as recited in claim 8, wherein the graduation carrier is cylindrical in shape, and the measuring graduation is disposed on a lateral surface of the cylinder, and scanning elements of the scanner are disposed at a scanning distance from the measuring graduation.

11. The method as recited in claim 8, wherein the evaluation electronics contains a memory in which the position of the machine part is stored.

12. The method as recited in claim 8, wherein the measurement of the position of the machine part is initiated by the subsequent electronics via a command that is transmitted through the interface to the evaluation electronics.

13. The method as recited in claim 8, wherein the evaluation electronics detects abrupt changes in the position of the machine part and initiates a measurement of the position of the machine part based on detecting one of the abrupt changes occurring.

14. The method as recited in claim 8, wherein the distance measurement operation is carried out while the shaft is at rest.

15. A braking system for an electric motor, the braking system comprising:
a brake disk non-rotatably connected to a shaft of the electric motor;
an armature plate which is supported so as to be movable in the axial direction of the shaft;
a first force-generator configured to produce a first force with which, in order to activate the brake, the armature plate is movable in the axial direction of the shaft and a surface of the armature plate is pressable against a surface of the brake disk to cause friction;
a second force-generator configured to produce a second force with which the armature plate is pullable away from the brake disk in order to release the brake; and
at least one brake lining disposed between surfaces where the friction is generated, wherein the shaft has mounted thereto a graduation carrier having a measuring graduation of a position-measuring device comprising:
a scanner mounted to the armature plate and configured to generate scanning signals by scanning the measuring graduation;
evaluation electronics configured to process the scanning signals into a digital angle value of the shaft; and
an interface configured to communicate with subsequent electronics,
wherein the scanning signals are dependent on a position of the armature plate in the axial direction of the shaft, and wherein a measure of the position of the armature plate in the axial direction of the shaft is determinable from the scanning signals by the evaluation electronics.

* * * * *